Nov. 12, 1963 W. J. PIERCE ETAL 3,110,372
FASTENER
Filed Nov. 14, 1960 2 Sheets-Sheet 2
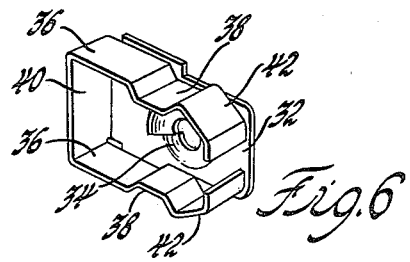
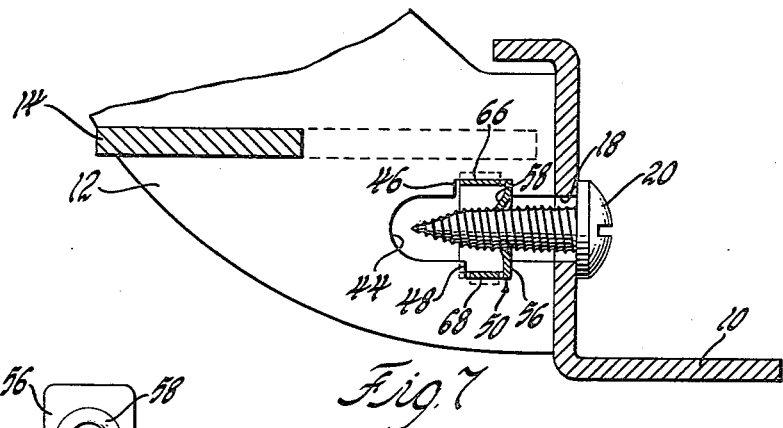
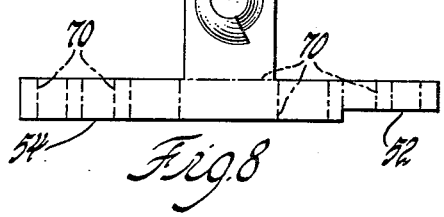
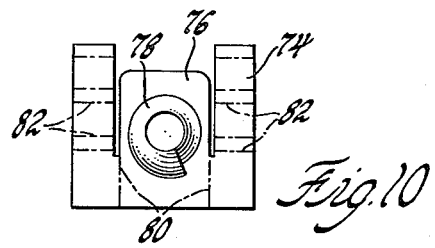
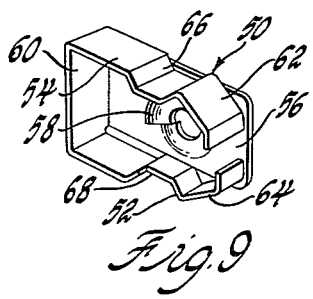
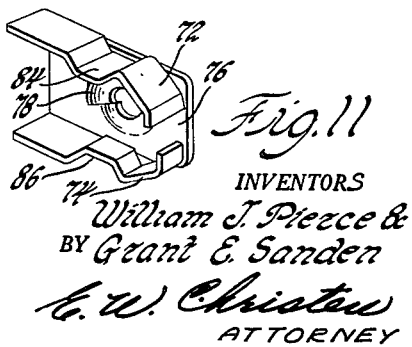
INVENTORS
William J. Pierce &
BY Grant E. Sanden
C. W. Christen
ATTORNEY United States Patent Office 3,110,372
Patented Nov. 12, 1963

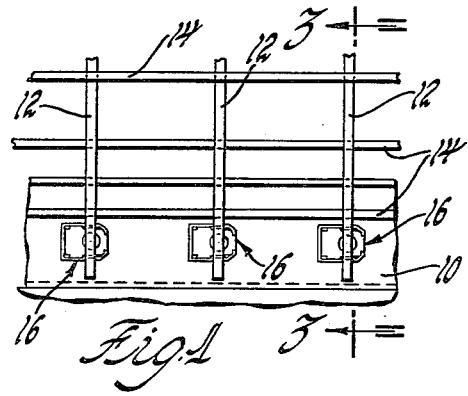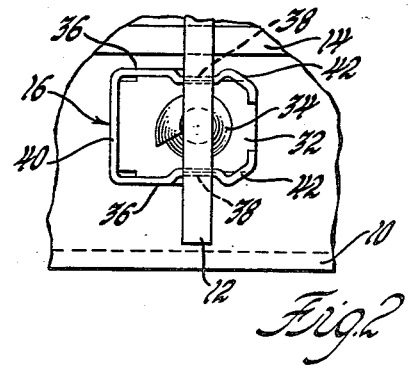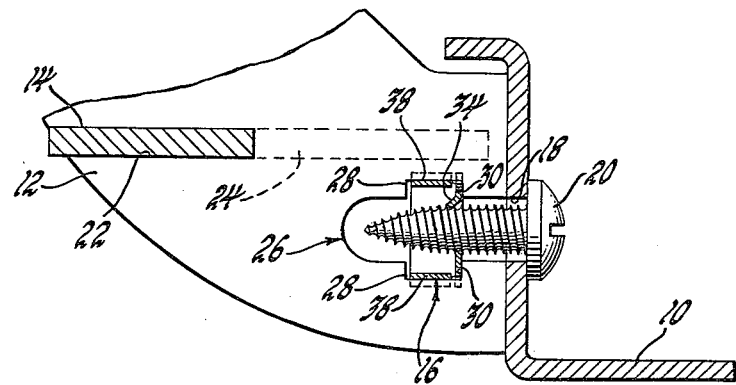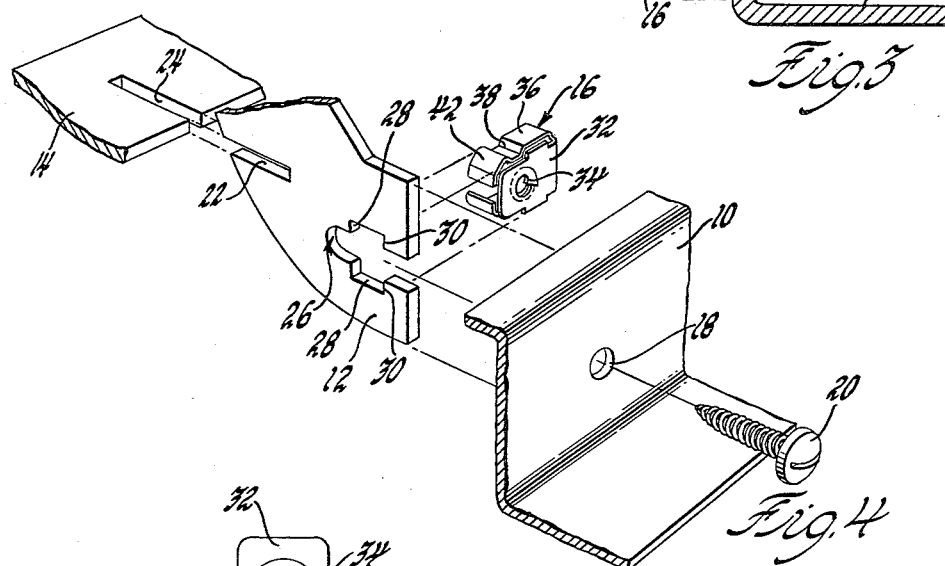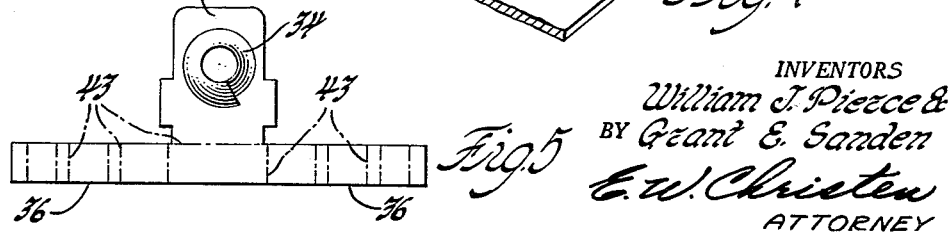

3,110,372
FASTENER
William J. Pierce, Detroit, and Grant E. Sanden, Dearborn, Mich., assignors to General Motors Corporation, Detroit, Mich., a corporation of Delaware
Filed Nov. 14, 1960, Ser. No. 68,893
5 Claims. (Cl. 189—36)

This invention relates to fasteners, and more particularly to a fastener device for securing a plate member to a support in edgewise relation.

In the design and manufacture of many articles and structures, for example motor vehicles, there are numerous instances in which a plate or panel must be secured to a support in such a manner that the plate or panel is in edgewise abutting relation to the support. A typical example of such a construction is in a vehicle grill structure wherein vertical or horizontal plates or panels may be secured to a support structure to provide the common checkerboard pattern. The vertical and horizontal fins or panels are presented edgewise to the support structure and in the past there have been many difficulties in providing a rigid and positive connection. For example, it has been necessary to weld or otherwise permanently secure the parts together which prevents the replacement and repair of such parts if it should be necessary. Other types of support include angle brackets riveted or bolted to the parts presenting an unsightly appearance and numerous difficulties in the assembly procedure. Further problems have been presented in the past in that the known methods of securing parts together do not permit blind or inaccessible mountings. This greatly restricts the design and manufacture of many articles and structures.

The device in which this invention is embodied comprises a sheet metal nut member which is receivable in a keyhole slot formed in one of the panel or plate members and which receives a machine screw or bolt passing through the support structure. The nut member is provided with resilient leg portions which retain the member in the plate or panel during the assembly procedure so that the plate or panel member and the nut member may be transported from place to place intact, thus decreasing the time and expense involved in the assembly procedure.

With a construction of this kind a positive and secure retention is provided for the fin or plate members to the supporting structure, and a means of retention which permits removal for repair and replacement purposes. The device is relatively inexpensive to manufacture, being formed of a sheet metal stamping or the like, and is inexpensive to install and use. A further advantage lies in the possibility of utilizing the structure in a blind or inaccessible position where only the screw or bolt receiving aperture in the supporting panel is easily reached. This permits greater latitude in the design and manufacture of many articles and devices.

These and other advantages will become more apparent from the following description and drawings, in which:

FIGURE 1 illustrates a typical example of plates or fins secured to a supporting structure and utilizing the nut structure in which this invention is embodied;

FIGURE 2 is an enlarged view of a portion of the structure illustrated in FIGURE 1 showing the nut structure in its proper position with respect to the various parts;

FIGURE 3 is an enlarged view of the construction shown in FIGURE 1 taken substantially along the line 3—3 of FIGURE 1 and looking in the direction of the arrows;

FIGURE 4 is an exploded perspective view of a portion of the construction illustrated in FIGURE 1 showing the position of the various parts;

FIGURE 5 is a plan view of the nut structure illustrated in FIGURES 1–4 and shown in the developed condition prior to the forming thereof;

FIGURE 6 is a perspective view of the nut member illustrated in FIGURES 1–5;

FIGURE 7 is a cross-sectional view of a fin-support construction utilizing a modification of the nut member illustrated in FIGURES 1–6;

FIGURE 8 is a plan view of the nut member modification illustrated in FIGURE 7, illustrating the developed condition of the nut member prior to its final forming;

FIGURE 9 is a perspective view of the nut member illustrated in FIGURES 7 and 8 in its completed condition;

FIGURE 10 is a plan view of a second modification of the nut member illustrated in FIGURES 1–6 showing its condition prior to the forming operation; and FIGURE 11 is a perspective view of the modification illustrated in FIGURE 10 showing the nut member in its final condition.

Referring more particularly to the drawings, FIGURE 1 illustrates a typical example of securing parts to a support in edgewise relation. The following description refers to this typical example, and it is to be understood that the nut structure may be utilized with any construction wherein a plate or panel member is to be secured in such edgewise relation to a support member.

In FIGURE 1 a portion of a vehicle grill assembly is illustrated in which a support member 10 is secured in some suitable manner to the motor vehicle frame or body, and vertical fin members 12 and horizontal fin members 14 are to be secured thereto. It is seen that the vertical fin members 12 have one edge thereof abutting the support member 10 and are retained in this position by means of the sheet metal nut member, illustrated generally by the numeral 16.

FIGURES 2 and 3 are enlarged views of a portion of FIGURE 1 and more clearly illustrate the construction. The support member 10 is shown in section to be an L-shaped or angle bar member having a suitable aperture 18 formed therein to receive a fastening member, such as a common machine screw or bolt, illustrated by the numeral 20. The vertical fin member 12 has a slot 22 formed therein to receive the horizontal fin member 14, also having a suitable slot 24 formed therein. This is a common construction wherein such plate members are secured together.

Vertical fin member 12 is provided with a keyhole slot, illustrated generally by the numeral 26, which has enlarged portions 28 formed transversely thereof. The enlarged portions 28 receive the nut member 16 in such a manner that the shoulders 30 provide a surface against which the nut member 16 may be suitably engaged. The machine screw or bolt 20 passes through the aperture 18 in the support member 10 and is received in the nut member 16 in a manner to be hereinafter described. The turning of the machine screw or bolt 20 serves to draw the nut member 16 against the shoulder 30 in the vertical fin 12, thus pulling the edge of the fin 12 into abutting relation with the adjacent surface of the support member 10. As the screw is fully tightened the vertical fin 12 will be rigidly secured in the proper position.

Referring to FIGURES 5 and 6, the structure of the nut member 16 is best shown. A plate or body portion 32 is provided with a suitable screw or bolt receiving impression 34 which is formed during the stamping process. Any of a number of well known impressions may be utilized to receive the screw or bolt 20, and the impression may be of the thread forming or thread cutting variety as well. A pair of leg members 36 are formed on the nut member and in their final condition, as shown in FIGURE 6, extend along the side edges of the body portion 32. The legs 36 are deformed, as at 38, to provide notches. Since the leg members 36 are separated from the body portion 32 along the longitudinal edges thereof and are connected to the body portion by means of the back portion 40, the legs have a certain degree of resilience permitting them to bend toward themselves, or toward the center of the body portion 32. The dimension between the outer ends of the slot enlargements 28 is substantially the same as the dimension between the outer surfaces of the notches and less than the dimension between the outer surfaces of the remainder of the legs. Thus, it may be seen that as the nut member is installed in the vertical fin 12 the legs may contract as the legs are received in the enlarged portions 28 of the slot 26, and expand when the notches 38 come into engagement therewith. The resilience of the legs 36 retains the nut member 16 in the vertical fin 12 prior to the insertion of the machine screw or bolt 20. The ends of the legs 36 may be provided with inclined surfaces 42 to facilitate the insertion of the nut member 16 in the slot 26. The inclined surfaces 42 will aid in causing the legs 36 to contract as the nut member is first inserted in the slot.

With the nut member 16 retained in the slot 26 in the manner above described, the vertical fin and nut assembly may be transported from place to place intact, and the machine screw or bolt 20 may be inserted and driven home at the proper time.

FIGURE 5 illustrates the stamping from which the nut member 16 may be constructed. As shown, the body portion 32 and impression 34 are formed at the time the stamping is made. The transversely extending portions are suitably bent along bent lines, illustrated by the numeral 43, to form the legs 36, notches 38 and the back portion 40. This may be accomplished in any suitable manner, as by standard punches and dies.

FIGURES 7-9 illustrate a modification of the nut member utilized in the same typical installation. The vertical fin 12 is to be secured to the support member 10 and has a horizontal fin 14 suitably secured thereto. Slots 22 and 24 in the vertical and horizontal fin members 12 and 14, respectively, permit such a construction. A keyhole slot 44 is provided in the vertical fin member 12 in which the upper enlargement 46 is of a greater width than the lower enlargement 48. The nut member 50, as shown more clearly in FIGURES 8 and 9, has leg member 52 of lesser width than the leg member 54, the leg members being substantially the same width as the respective enlargements 46 and 48 in the keyhole slot 44. The leg member 54, which is of greater width than the leg member 52, is thus receivable only in the upper enlargement 46 of the keyhole slot 44 making it possible for the nut member 50 to be inserted in the fin in only one direction. This may be a decided aid during the assembly procedure.

The nut member 50 is provided with a body portion 56 having a suitable thread receiving or thread forming impression 58 formed therein. Leg members 52 and 54 are separated from the body portion 56 to provide a degree of resilience and are formed from the back portion 60. Inclined surfaces 62 and 64 formed on the leg members 52 and 54, respectively, lead the legs into the enlargements 46 and 48 in the slot 44, and the notches 66 and 68 engage the enlargements 46 and 48 to retain the nut member in the vertical fin 12. As illustrated in FIGURE 8, nut member 50 may be formed from a stamping with the impression 58 formed in the body portion 56 and the lateral extensions being bent along the lines 70 to form the legs 52 and 54 and the notches 66 and 68.

FIGURES 10 and 11 illustrate another modification of the nut member in which the leg portions 72 and 74 are bent or formed directly from the body portion 76. As illustrated in FIGURE 10, body portion 76 is provided with a thread forming or thread cutting impression 78 and the sheet metal pieces from which the legs 72 and 74 are formed extend lengthwise of the body portion 76 and are connected thereto at their rearward portions. The leg members are bent directly downwardly along the bend lines 80 and bent along the lines 82 to form the notches 84 and 86. The modification illustrated in FIGURES 10 and 11 is utilized and installed in the same manner as the modifications illustrated in FIGURES 1-9.

Thus, a sheet metal nut member is provided which permits edgewise retention of one plate member to another in a positive and rigid manner. The nut member may be assembled with the plate member prior to its final installation and transported therewith for the final assembly. With this construction it is easily seen that inaccessible or hard to reach installations may easily be made and that the edgewise securement may be relatively simply done.

What is claimed is:

1. A fastening assembly for securing a panel to a support in edgewise relation, said panel having a keyhole slot formed therein and adjacent one edge thereof, said fastening assembly including a nut member and a threaded member, said nut member comprising a plate portion having a thread receiving impression formed therein, a back portion extending at substantially right angles from said plate portion, a leg extending from each side of said back portion and along the sides of said plate portion, each of said legs being formed to define a notch intermediate the ends thereof, said nut member being receivable in said keyhole slot and normal to the plane of said panel and with said notches in said legs engaging said panel and retaining said nut member thereon, and said threaded member being receivable in said support and in said impression in said nut member and adapted to draw said nut member and said panel into secure engagement with said support.

2. A sheet metal nut member for use in securing a panel to a support in edgewise relation, said panel having a slot formed therein and adjacent the edge thereof, said nut member comprising a plate portion having a thread receiving impression formed therein, a back portion extending at substantially right angles from one end of said plate portion, a resilient leg extending from each side of said back portion and along the sides of said plate portion, each of said legs being formed to include a notch intermediate the ends thereof, said nut member being receivable in said slot in said panel and transversely of said panel and with said legs containing said notches deflecting until said notches are in engagement with the edges of said slot to retain said nut member therein.

3. The sheet metal nut member set forth in claim 2, wherein one of said legs is of less width than the other of said legs to permit insertion of said nut member in said slot in only one position.

4. A sheet metal nut member for use in securing a panel to a support in edgewise relation, said panel having a slot formed therein and adjacent one edge thereof, said nut member comprising a plate portion having a thread receiving impression formed therein, a resilient leg extending along each side of said plate portion and in a plane substantially normal thereto, each of said legs having a depressed portion forming a notch and the distance between said notches being substantially the same as the width of said slot in said panel, said legs being separated from said plate portion from the rear end of said notches to the forward ends of said legs to permit said legs to first contract and then expand as said nut member is inserted in said slot in a plane normal to the plane of said panel, said legs being adapted to secure said nut member in screw receiving relation in said panel for securement of said panel to said support.

5. The sheet metal nut member set forth in claim 4, wherein one of said legs is of less width than the other of said legs to permit insertion of said nut member in said slot in only one position.

References Cited in the file of this patent
UNITED STATES PATENTS

| | | |
|---|---|---|
| 2,737,269 | Flora | Mar. 6, 1956 |
| 2,745,458 | Bedford | May 15, 1956 |
| 2,825,379 | Becker | Mar. 4, 1958 |